US010218139B2

(12) United States Patent
Zantout et al.

(10) Patent No.: US 10,218,139 B2
(45) Date of Patent: Feb. 26, 2019

(54) TWIST-ON WIRE CONNECTOR AND APPLICATION TOOL THEREFOR

(71) Applicant: IDEAL Industries, Inc., Sycamore, IL (US)

(72) Inventors: Alan Emad Zantout, Sycamore, IL (US); Pryce L. Nutting, Seneca, MO (US)

(73) Assignee: IDEAL Industries, Inc., Sycamore, IL (US)

( * ) Notice: Subject to any disclaimer, the term of this patent is extended or adjusted under 35 U.S.C. 154(b) by 381 days.

(21) Appl. No.: 14/817,340

(22) Filed: Aug. 4, 2015

(65) Prior Publication Data

US 2016/0359287 A1 Dec. 8, 2016

Related U.S. Application Data

(60) Provisional application No. 62/170,374, filed on Jun. 3, 2015.

(51) Int. Cl.

*B23P 19/00* (2006.01)
*H01R 43/042* (2006.01)
*H01R 43/04* (2006.01)
*H01R 4/22* (2006.01)
*H01R 43/033* (2006.01)

(52) U.S. Cl.

CPC ............... *H01R 43/04* (2013.01); *H01R 4/22* (2013.01); *H01R 43/033* (2013.01); *Y10T 29/53226* (2015.01)

(58) Field of Classification Search

CPC .......... H01R 4/22; H01R 4/12; H01R 13/631; H01R 43/04; H01R 13/6205; Y10T 29/49204; Y10T 29/5313; Y10T 29/53222; Y10T 29/53226

USPC .......... 29/751, 729, 747, 748, 750, 757, 758

See application file for complete search history.

(56) References Cited

U.S. PATENT DOCUMENTS

| | | | | |
|---|---|---|---|---|
| 3,787,948 | A | 1/1974 | Runge | |
| 3,887,981 | A | 6/1975 | Mazzeo et al. | |
| 4,227,040 | A | 10/1980 | Scott | |
| 4,823,650 | A | 4/1989 | Tuttle | |
| 5,216,781 | A | 6/1993 | Brondfield | |
| 5,427,270 | A | 6/1995 | Patterson | |
| 5,784,935 | A * | 7/1998 | Korinek | B25B 13/50 81/467 |
| 5,974,916 | A | 11/1999 | Lassiter | |

(Continued)

OTHER PUBLICATIONS

ISA/US, Int. Search Report and Written Opinion issued on PCT application No. US16/35043, dated Aug. 25, 2016, 16 pages.

*Primary Examiner* — Thiem Phan

(74) *Attorney, Agent, or Firm* — Greenberg Traurig, LLP

(57) ABSTRACT

A twist-on wire connector is releasably engageable with a tool. The connector and the tool are provided with complimentary driving features which allow the tool to be moved independent of and relative to the connector when the tool is moved in one rotational direction and which place the tool and connector into driving engagement when the tool is moved in the opposite rotational direction such that the connector is moved with the tool to apply the connector onto a plurality of electrical conductors. The complimentary driving features are provided to the tool and the connector by providing to each of the tool and the connector one or more engagement surfaces positioned adjacent to a slipping surface.

10 Claims, 7 Drawing Sheets

(56) References Cited

U.S. PATENT DOCUMENTS

| | | | | |
|---|---|---|---|---|
| 6,198,049 | B1 | 3/2001 | Korinek | |
| 6,922,887 | B1 | 8/2005 | Keswani | |
| 7,356,914 | B2 | 4/2008 | Keswani et al. | |
| 7,365,270 | B2 | 4/2008 | Michaud et al. | |
| 2011/0162487 | A1* | 7/2011 | Cline | B25B 13/48<br>81/60 |

* cited by examiner

TWIST-ON WIRE CONNECTOR AND APPLICATION TOOL THEREFOR

RELATED APPLICATION INFORMATION

This application claims the benefit of U.S. Provisional Application No. 62/170,374, filed on Jun. 3, 2015, the disclosure of which is incorporated herein by reference in its entirety.

BACKGROUND

The following generally relates to twist-on wire connectors used to connect electrical conductors, such as wires, and, more particularly, relates to a twist-on wire connector which may be applied to electrical conductors via use of a corresponding application tool.

Twist-on or screw-on wire connectors are well known in the art. Generally, these connectors are used to connect the ends of two or more electrical conductors, such as wires. The connectors typically include a housing formed from an electrically insulating material, such as plastic, in which is disposed an electrical connecting element formed from an electrically conductive material, such as a shaped wire spring. In this manner, when the housing is placed over the ends of the electrical conductors, the housing shell is rotated to twist the connecting element onto the ends of the electrical conductors to thereby bring the ends of the electrical conductors and the electrical connecting element into secured electrical contact with each other.

For use in applying the connector to the ends of the electrical conductors, it is known to provide diametrically opposed wings to the housing shell to provide a degree of leverage to permit the twisting of the connector onto the conductors as shown in U.S. Pat. No. 4,227,040. Similarly, U.S. Pat. No. 7,365,270 discloses a twist-on wire connector which includes a pair of diametrically opposed, outwardly extending wings where each of the wings is provided with two sections having different dimensions to accommodate manual attachment or attachment by use of a tool, such as a socket, to apply the connector to the conductors. Still further, U.S. Pat. No. 6,922,887 discloses a socket for applying a twist-on wire connector, U.S. Pat. No. 7,356,914 discloses a wire connector applicator which automatically feeds and installs twist-on wire connectors to ends of electrical conductors, and U.S. Pat. No. 3,887,981 discloses an installation tool for wire connectors.

For the sake of brevity in the description which follows, the disclosure within each of the above-noted patents is incorporated herein by reference in its entirety.

SUMMARY

Described hereinafter is an exemplary twist-on wire connector and exemplary application tools for applying the twist-on wire connector onto the ends of electrical conductors. The connector is releasably engageable with the tool and the twist-on wire connector and the tool are provided with complimentary driving features. The complimentary driving features allow the tool to be moved independent of and relative to the twist-one wire connector when the tool is moved in one rotational direction and place the tool and twist-on wire connector into driving engagement when the tool is moved in the opposite rotational direction such that the twist-on wire connector is moved with the tool for applying the twist-on wire connector onto the ends of the electrical conductors. More particularly, the complimentary driving features are provided to the tool and the twist-on wire connector by providing to each of the tool and the twist-on wire connector one or more engagement surfaces positioned adjacent to a slipping surface.

While the foregoing provides a general description of the subject electrical connector and application tools, a better understanding of the objects, advantages, features, properties, and relationships of the subject electrical connector and application tools will be obtained from the following detailed description and accompanying drawings which set forth illustrative embodiments and which are indicative of the various ways in which the principles of the invention claimed hereinafter may be employed.

BRIEF DESCRIPTION OF THE DRAWINGS

For a better understanding of the hereinafter described electrical connector and application tools, reference may be had to the following drawings in which.

DETAILED DESCRIPTION

Figure 1:
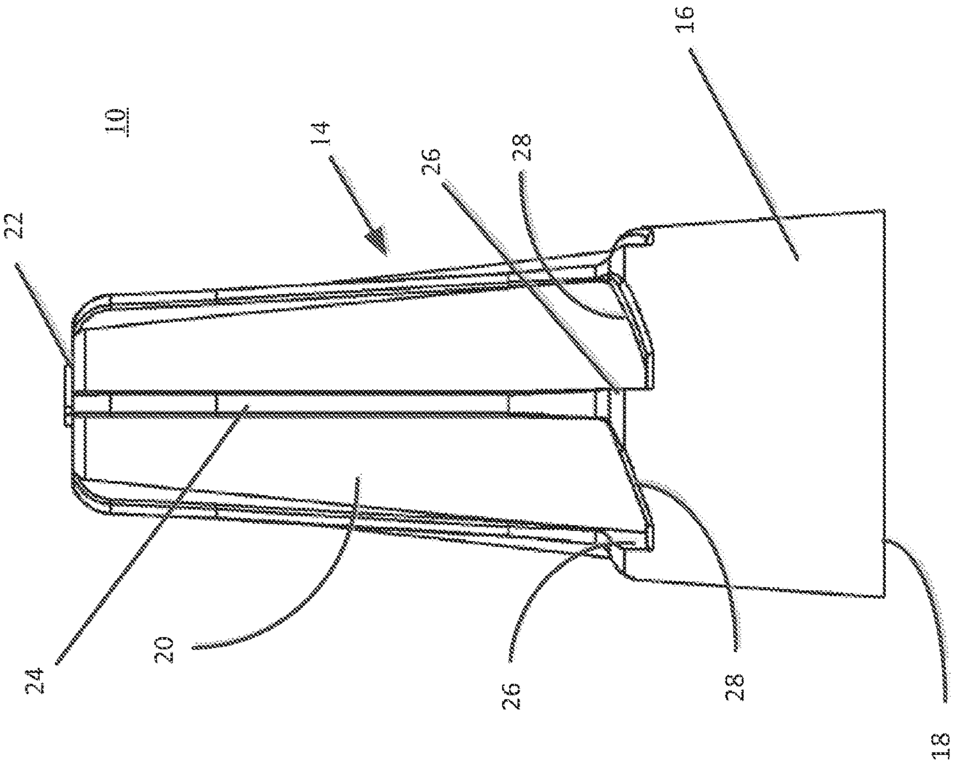
FIG. 1 illustrates an exemplary twist-on electrical connector for use in electrically connecting a plurality of electrical conductors.

Turning now to the figures, wherein like elements are references using like identifiers, described hereinafter is an exemplary twist-on wire connector 10 and exemplary tools 12 for use in applying the twist-on wire connector 10 onto the ends of electrical conductors. As particularly shown in FIG. 1, the twist-on wire connector 10 includes a housing 14 in which is disposed an electrical connecting element 11, such as a metallic, conical spring (illustrated in FIGS. 11-13). As is well-known in art, the connector 10 is usable to connect two or more electrical conductors together by applying the housing over the ends of the electrical conductors to thereby bring the electrical conductors and the electrical connecting element into secure engagement with each other. Housing 14 is preferably formed using an electrically insulative material, such as a molded thermoplastic material, and may be provided with a generally frustoconical shape that generally tapers from a lower portion 16, having an opening 18 which leads to a cavity in which is disposed the electrical connecting element, to an upper portion 20, which terminates in a closed end 22. While not required, the upper portion 20 of the connector 10 can be provided with one or more gripping elements 24, such as outwardly extending ribs, flattened features, dimples, or the like, to assist in the tightening of the connector 10 upon electrical conductors (absent use of the tool 12 or in connection with use of tool 12' described hereinafter) when inserted into the connector 10.

For cooperating with the tool 12 (or possibly tool 12') for the purpose of applying the connector 10 upon electrical conductors when inserted into the connecting element of the connector 10, the housing 14 is provided with an externally located driving feature that is cooperable with a corresponding driving feature provided to the tool 12. In the example connector 10 illustrated in FIG. 1, the driving feature is formed integral with the housing 14 between the lower portion 16 of the housing 14 and the upper portion 20 of the housing 14 and provides one or more engagement surfaces 26, e.g., a surface portion that is not inclined relative to the direction of the motive force being applied to the connector 10, positioned adjacent to a slip surface 28, e.g., a surface that is inclined relative to the direction of the motive force being applied to the connector. In a preferred embodiment, a plurality of alternatively arranged engagement surfaces 26 and slip surfaces 28 are formed around an entirety of the housing 14. While the upper surface of the lower portion 16 of the housing 14 of the example connector 10 illustrated in FIG. 1 is arranged to form the engagement surfaces 26 and the slip surfaces 28 (thus providing a stepped change in the diameter of the housing 14 which, in this example, demarks the transition from the lower portion 16 to the upper portion 20 of the housing 14) it will be appreciated that the engagement surfaces 26 and slip surfaces 28 can be formed as free-standing structures on the housing 14 intermediate the lower portion 16 and the upper portion 20 as desired.

Figure 2C:
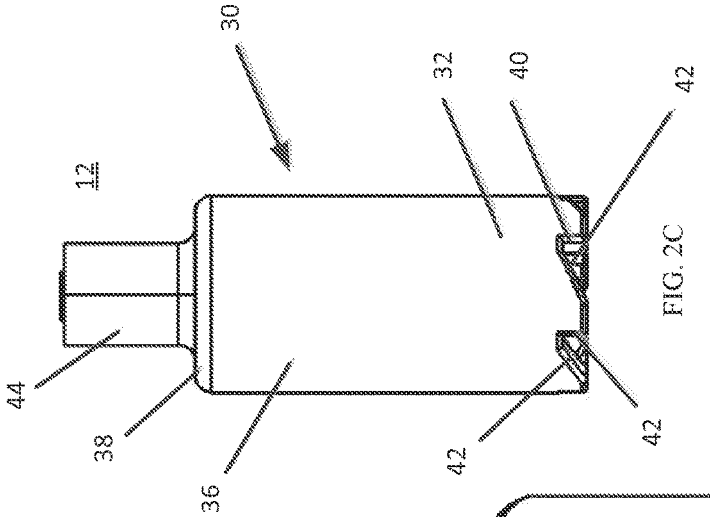
FIGS. 2A-2C illustrate an exemplary tool for use in applying the exemplary connector of FIG. 1 to a plurality of electrical conductors.
Figure 2B:
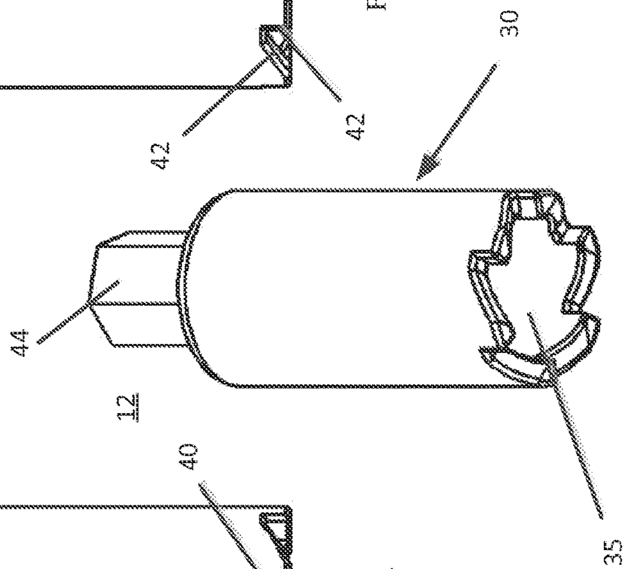
Figure 2A:
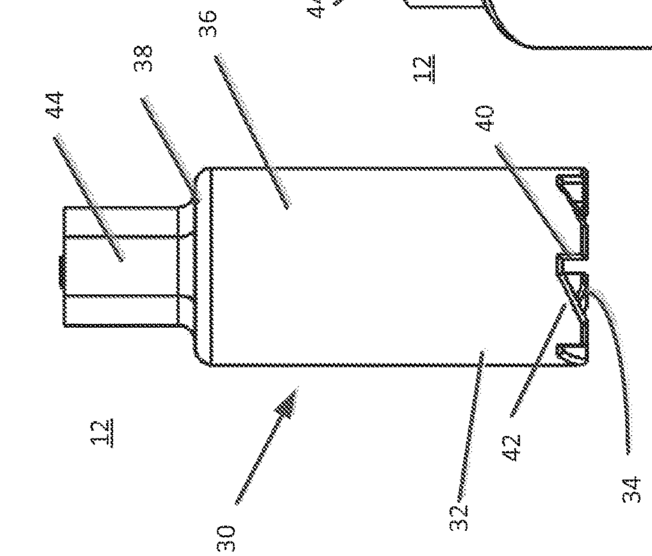
Figure 3E:
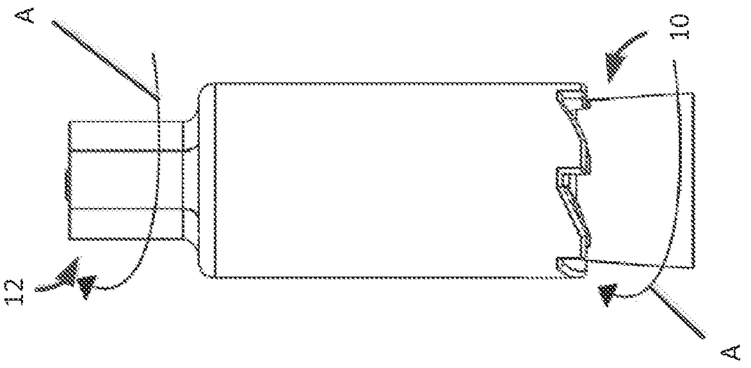
FIGS. 3A-3E illustrate an exemplary use of the tool to apply the exemplary connector of FIG. 1 to a plurality of electrical conductors.
Figure 3D:
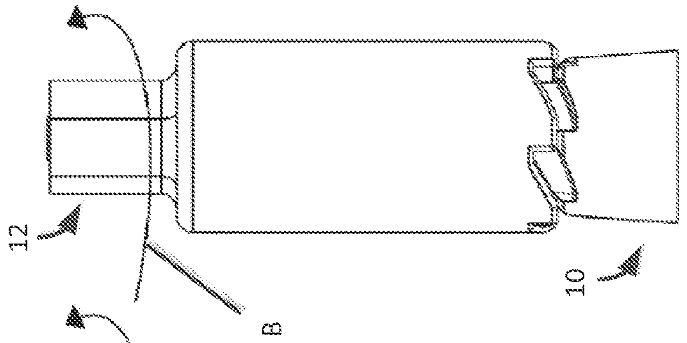
Figure 3C:
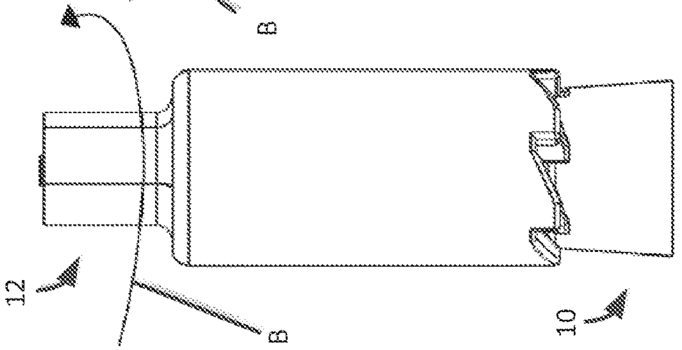
Figure 3B:
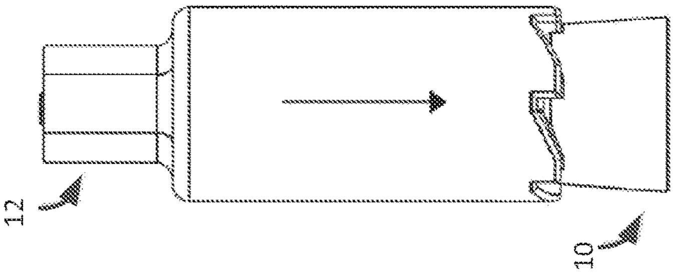
Figure 3A:
Figure 4B:
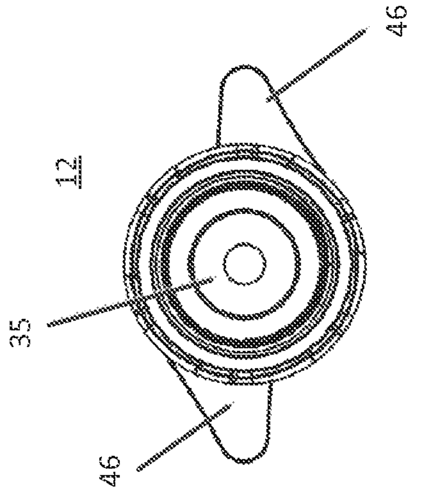
FIGS. 4A and 4B illustrate a further exemplary tool for use in applying the exemplary connector of FIG. 1 to a plurality of electrical conductors.
Figure 4A:
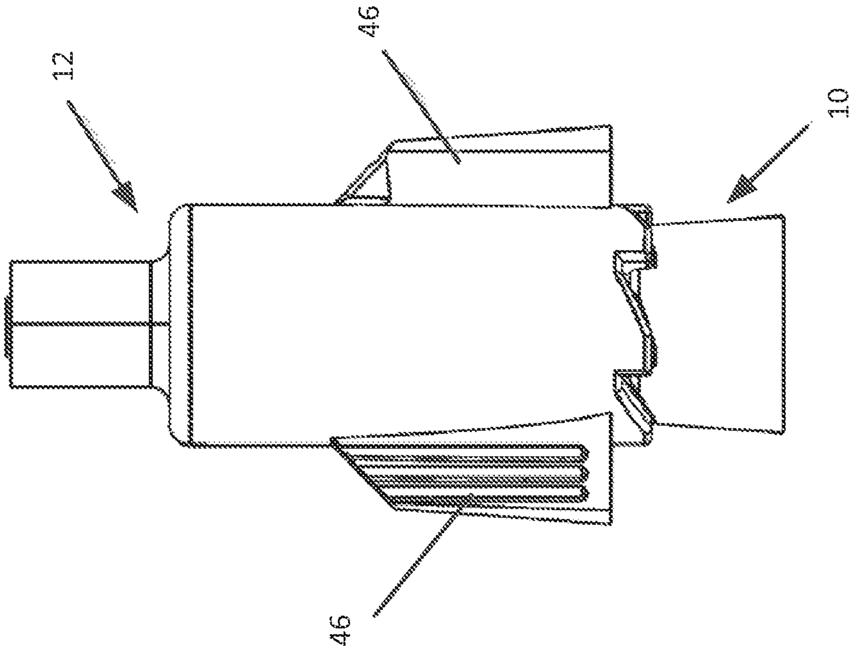

Turning now to FIGS. 2A-2C, the tool 12 provided for use with the connector 10 includes a housing 30 having a lower portion 32 having an opening 34 which leads to a cavity 35 in which is to be removeably positioned the upper portion 20 of the housing 14 of the connector 10 and an upper portion 36 which terminates at an end 38. Preferably, the cavity 35 is sized to avoid engagement with any gripping features provided to the connector housing 14 to thereby allow the tool to be rotated independent of the connector as described further below. The housing 30 of the tool 12 can be formed using any desired material and may be provided with a cylindrical shape as illustrated, a frustoconical shape, or the like as desired. As further illustrated, the lower portion 32 of the housing 30 of the tool 12 is provided with a driving feature that is cooperable with the driving feature that is provided to the housing 14 of the connector 10. In this regard, like the driving feature that is provided to the housing 14 of the connector 10, the driving feature provided to the housing 30 of the tool 12 includes one or more engagement surfaces 40 positioned adjacent to a slip surface 28. While the tool illustrated in FIGS. 2A-2C includes a plurality of alternatively arranged engagement surfaces 26 and slip surfaces 28 that are formed on the lower surface of the lower portion 32 of the housing 30 so as to surround the entirety of the opening 34, it will be appreciated that other arrangements are contemplated, e.g., the engagement surfaces 26 and slip surfaces 28 can be formed as free-standing structures on the interior of housing 30 at a location on the housing 20 that ensures an engagement with the corresponding features provided to the connector 10 when the connector 10 is inserted into the cavity 35/upper portion 36 of the housing 30. Furthermore, while the exemplary tool 12 illustrated in FIGS. 2A-2C includes a stem portion 44 positioned at the end 28 of the housing 30 for allowing the tool 12 to be coupled to/driven by a wrench or the like, it will be appreciated that alternative embodiments may instead include an opening/aperture for receiving a driving stem of a tool, may include gripping elements, such as wings 46, as illustrated in FIGS. 4A and 4B, flat portions, dimples, or the like (in addition to or in place of a stem and/or an opening) to assist in rotation of the tool 12 without limitation.

Turning now to FIGS. 3A-3E, to apply the connector 10 to electrical conductors the connector 10 is to be positioned within the cavity 35/upper portion 36 of the housing 30 of the tool 12 whereupon the driving feature of the tool 12 will be positioned to cooperate with the driving feature of the connector 10. In this manner, when the tool 12 is rotated clockwise relative to the connector 10 (shown as direction A in FIG. 3E) the engagement surface(s) 40 of the housing 30 will be brought into engagement with the engagement surface(s) 26 of the housing 14 to drive the connector 10 relative to the electrical conductors positioned within the connector 10, i.e., to rotate the connector 10 with the tool 12. However, when the tool 12 is rotated counter-clockwise relative to the connector 10 (shown as direction B in FIGS. 3C and 3D) the slip surface(s) 42 of the housing 30 will slip across the slip surface(s) 28 of the housing 14 to allow the connector 10 to maintain its position relative to the electrical conductors positioned within the connector 10, i.e., to allow the tool 12 to be rotated independent of and relative to the connector 10. As will be appreciated, the occurrence of these actions upon such clockwise and counter-clockwise motions allows the tool 12 to be used to ratchet the connector 10 upon the electrical conductors. As will also be appreciated, while the engagement surfaces 26 and the slip surfaces 28 of the example connector 10 illustrated in FIG. 1 and the engagement surfaces 40 and slip surfaces 42 of the example tool 12 illustrated in FIGS. 2A-2C are arranged for clockwise twisting of the connector 10 upon the electrical conductors this arrangement can be altered for counter-clockwise twisting of the connector 10 upon the electrical conductors as desired.

It will also be appreciated that the example connector 10 can be modified to function as a holding element for an otherwise conventional twist-on connector. To this end, the cavity of the exemplary connector 10 would be modified to omit the electrical connecting element and would instead be sized and arranged to releasably and securely engage at least a portion of a conventional twist-on connector. In this manner, in keeping with the foregoing description, the driving feature provided to the tool housing would be cooperable with the driving feature provided to the connector holding element such that, when the tool is operationally positioned upon the twist-one wire connector holding element, the tool is free to move independent of and relative to the connector holding element (and the twist-on wire connector held within the connector holding element) when the tool is moved in one rotational direction and the tool is caused to drivingly engage and move therewith the connector holding element (and the twist-on wire connector held within the connector holding element) when the tool is moved in an opposite rotational direction.

Figure 6:
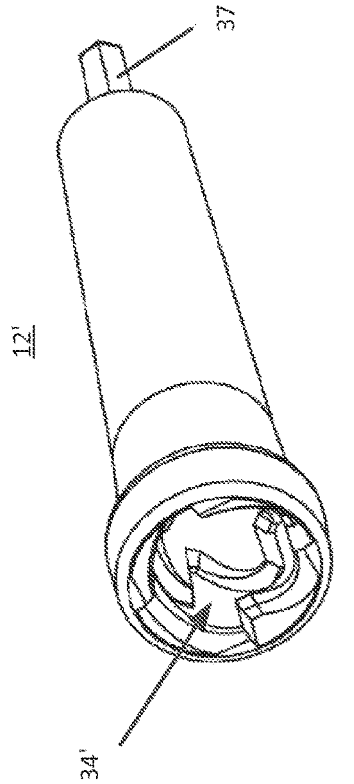
FIG. 6 illustrates an isometric view of the tool of FIG. 5.
Figure 5:
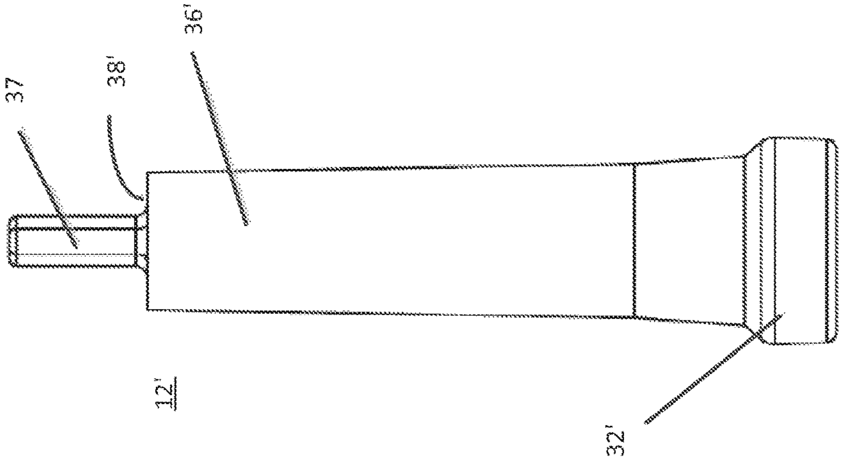
FIG. 5 illustrates an exemplary tool for use in applying plural different connectors to a plurality of electrical conductors.
Figures 8A, 8B, 9A, 9B, 10A, 10B:
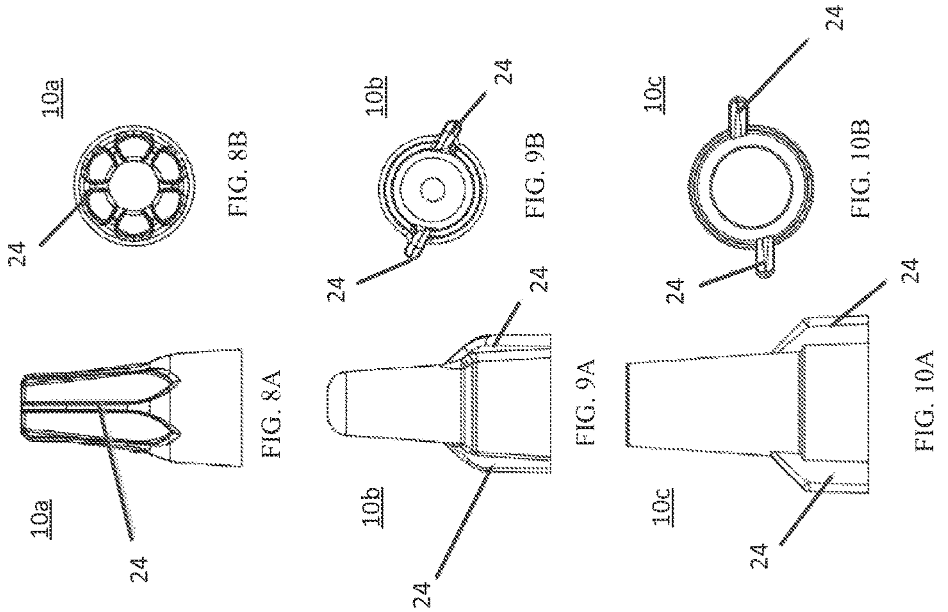
FIGS. 8A and 8B illustrate a side view and top view, respectively, of a first exemplary connector capable of being driven by the tool of FIG. 5.
FIGS. 9A and 9B illustrate a side view and top view, respectively, of a second exemplary connector capable of being driven by the tool of FIG. 5.
FIGS. 10A and 10B illustrate a side view and top view, respectively, of a third exemplary connector capable of being driven by the tool of FIG. 5.
Figure 7:
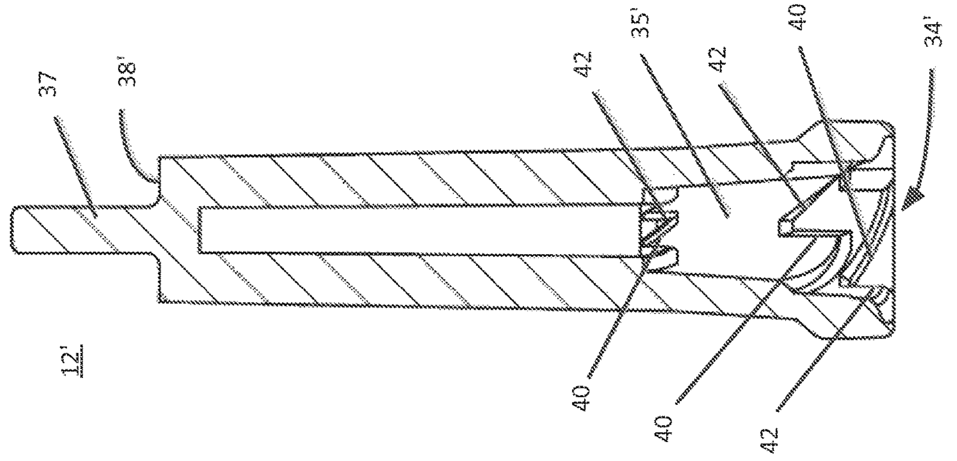
FIG. 7 illustrates a cross-sectional view of the tool of FIG. 5.

Turning now to FIGS. 5-7, a further tool 12' for use in applying any one of a plurality of differently shaped connectors upon electrical conductors when inserted into the connecting element of the connector is illustrated. While not intended to be limiting, the exemplary tool 12' can be used to apply previously described connector 10, connector 10*a* (illustrated in FIGS. 8A and 8B, connector 10*b* (illustrated in FIGS. 9A and 9B), or connector 10*c* (illustrated in FIGS. 10A and 10B) upon electrical conductors. In general, connector 10*a* includes outwardly extending gripping elements 24 (in the general form of ribs) that are provided to the upper portion 20 of the connector housing while connectors 10*b* and 10*c* include outwardly extending gripping elements 24 (in the general form of wings) that are provided to the lower portion 16 of the connector housing where the gripping elements cause each of the connectors to having different overall size dimensions. For applying any one of such connectors onto the ends of the electrical conductors, the tool 12' in this instance is provided with a plurality of driving features each of which allows the tool to be moved independent of and relative to a corresponding one of the plurality of different connectors when the tool 12' is moved in one rotational direction and to place the tool 12' into driving engagement with the gripping element(s) of that connector when the tool is moved in the opposite rotational direction. As described previously, each of the plurality of driving features provided to the tool 12' includes one or more engagement surfaces 40 positioned adjacent to one or more slip surfaces 42.

Figure 13:
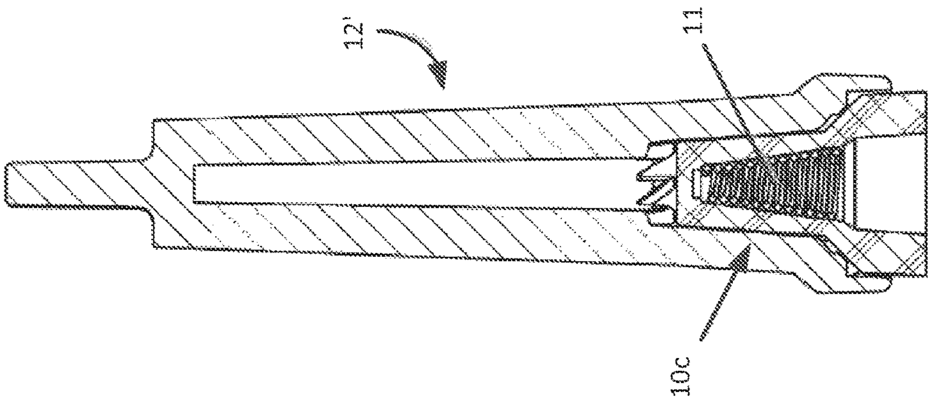
FIG. 13 illustrates a cross-sectional view of the tool of FIG. 5 engaged with the exemplary connector of FIG. 10.
Figure 12:
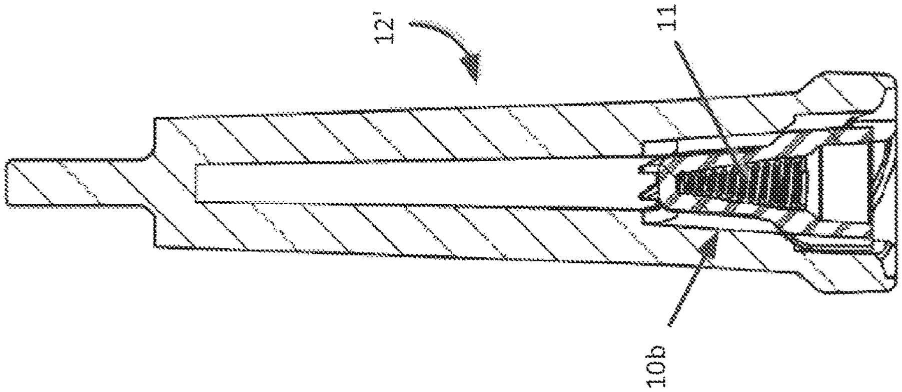
FIG. 12 illustrates a cross-sectional view of the tool of FIG. 5 engaged with the exemplary connector of FIG. 9.
Figure 11:
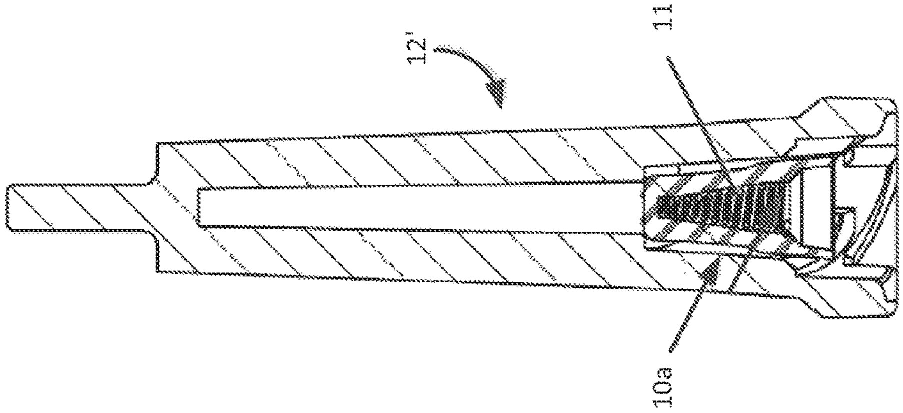
FIG. 11 illustrates a cross-sectional view of the tool of FIG. 5 engaged with the exemplary connector of FIG. 8.

More particularly, for receiving a connector for the purpose of placing the connector into engagement with a corresponding one of the driving features of the tool 12', the tool 12' has a lower portion 32' having an opening 34' which leads to a cavity 35' in which is to be removeably positioned the housing of each of the connectors and an upper portion 36' which terminates at an end 38'. The housing of the tool 12' can be formed using any desired material and may be provided with a cylindrical shape, a frustoconical shape, or the like as desired. As further illustrated, the upper portion 36' of the housing may be provided with a driving element 37, e.g., a shaped stem portion, for allowing the tool 12' to be driven by a driving tool, such as a socket wrench or the like. Within the cavity 35' is positioned, at spaced intervals, the plurality of driving features with the plurality of driving features being sized and arranged for engagement with the gripping element(s) of a corresponding one of the plurality of connectors. In this regard, the driving feature provided closest to the opening 34' is preferably sized and arranged for driving engagement with the gripping element(s) of the largest dimensioned one of the connectors, e.g., connector 10*c*, while being sized to allow the gripping element(s) of the smaller dimensioned ones of the connectors to pass thereby for engagement with their corresponding driving feature, the driving feature provided furthest from the opening 34' is preferably sized and arranged for driving engagement with the gripping element(s) of the smallest dimensioned one of the connectors, e.g., connector 10 or connector 10*a* and, owing to its positioning within the cavity 35', preferably avoids engagement with any of the gripping element(s) of the larger dimensioned connectors, while one or more driving features sized and arranged to similarly engage the gripping element(s) of intermediately sized connectors, such as connector 10*b*, may be positioned therebetween as shown in FIGS. 11-13.

To apply a desired one of the connectors to electrical conductors, the desired one of the connectors is to be positioned within the cavity 35' of the tool 12' whereupon the engaging surface 40 of the appropriate one of the driving features of the tool 12' will be positioned to cooperate with at least a portion of the gripping element(s) of the connector. In this manner, when the tool 12' is rotated counter-clockwise relative to the connector (in the illustrated embodiment) the engagement surface(s) of the appropriate one of the driving features will be brought into engagement with the gripping element(s) of the housing of the connector to drive the connector relative to the electrical conductors positioned within the connector, i.e., to rotate the connector with the tool 12'. However, when the tool 12' is rotated clockwise relative to the connector, the slip surface(s) 42 of the driving feature will slip across the gripping element(s) of the housing of the connector to allow the connector to maintain its position relative to the electrical conductors positioned within the connector, i.e., to allow the tool 12' to be rotated independent of and relative to the connector. As will be appreciated, the occurrence of these actions upon such clockwise and counter-clockwise motions allows the tool 12' to be used to ratchet the connector upon the electrical conductors. As will also be appreciated, the arrangement of the engagement surfaces and the slip surfaces can be altered as desired to provide for clockwise tightening and counter-clockwise slipping as desired.

While specific embodiments of the subject invention have been described in detail, it will be appreciated by those skilled in the art that various modifications and alternatives to those details could be developed in light of the overall teachings of this disclosure. For example, a magnet can be provided to at least one of the tool 12 and the connector 10, with the other of the tool 12 and the connector 10 being provided with a complementary magnet or piece of ferromagnetic material, for use in temporarily holding the two components together during the attachment process. It will therefore be appreciated that features described with respect to the various embodiments are not to be limited to any particular embodiment but may be freely used across embodiments where applicable. Additionally, it will be appreciated that the size, shape, arrangement, and/or number of components illustrated and described can be changed as necessary to meet a given need. Accordingly, the particular arrangements disclosed are meant to be illustrative only and not limiting as to the scope of the invention which is to be given the full breadth of the appended claims and any equivalents thereof.

What is claimed is:

1. A system for connecting electrical conductors, comprising:

a twist-on wire connector comprising a connector housing having an upper end, a lower end having an opening, and a central cavity in communication with the opening for accommodating an electrical connecting element, the connector housing having a first driving feature; and a tool for use in applying the twist-on wire connector to a plurality of electrical conductors comprising a tool housing having an upper end, a lower end having an opening, and a central cavity in communication with the opening for releasably receiving therein at least the upper end of the connector housing, the tool housing having a second driving feature that is complementary to the first driving feature such that, when the tool is fully positioned upon the twist-on wire connector, the second driving feature of the tool cooperates with the first driving feature of the twist-on wire connector only to cause the tool to be axially displaced relative to the twist-on wire connector such that the tool is free to move independent of and relative to first driving feature of the twist-on wire connector when the tool is moved in one rotational direction and the second driving feature of the tool cooperates with the first driving feature of the twist-on wire connector to cause the tool to drivingly engage and move therewith the twist-on wire connector when the tool is moved in an opposite rotational direction.

2. The system as recited in claim 1, wherein the first driving feature comprises at least one engagement surface positioned adjacent to a slip surface provided to the connector housing and the second driving feature comprises at least one engagement surface positioned adjacent to a slip surface provided to the tool housing.

3. The system as recited in claim 1, wherein the first driving feature comprises a plurality of engagement surfaces positioned intermediate a plurality of slip surfaces provided to the connector housing and the second driving feature comprises a plurality of engagement surfaces positioned intermediate a plurality of slip surfaces provided to the tool housing.

4. The system as recited in claim 1, wherein the upper end of the tool housing comprises a stem for cooperable engagement with a rotational driving tool.

5. The system as recited in claim 1, wherein the upper end of the tool housing comprises an aperture for cooperable engagement with a stem of a driving tool.

6. The system as recited in claim 1, wherein the tool housing is provided with one or move gripping features for use in rotating the tool.

7. The system as recited in claim 6, wherein the one or more gripping features comprises a pair of diametrically opposed, outwardly extending wings provided to the tool housing.

8. The system as recited in claim 1, wherein the connector housing is provided with one or more gripping features for use in rotating the twist-on wire connector in the absence of the tool.

9. The system as recited in claim 8, wherein the one or more gripping features comprises a plurality of exteriorly located elongated ribs provided to the connector housing.

10. The system as recited in claim 1, wherein at least one of the tool and the connector includes a magnet and the other of the tool and the connector includes a complementary magnet or piece of ferromagnetic material for use in temporarily holding the connector and tool in engagement.

* * * * *